US011774359B2

(12) United States Patent
 Pelisson

(10) Patent No.: US 11,774,359 B2
(45) Date of Patent: Oct. 3, 2023

(54) SMOKE DETECTOR

(71) Applicant: Commissariat à l'Energie Atomique et aux Energies Alternatives, Paris (FR)

(72) Inventor: Roland Pelisson, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 215 days.

(21) Appl. No.: 16/948,664

(22) Filed: Sep. 28, 2020

(65) Prior Publication Data
 US 2021/0096071 A1 Apr. 1, 2021

(30) Foreign Application Priority Data
 Sep. 30, 2019 (FR) ...................................... 1910818

(51) Int. Cl.
 *G01N 21/53* (2006.01)
 *B08B 1/00* (2006.01)
 *B08B 1/04* (2006.01)
 *B08B 9/00* (2006.01)
 *B08B 13/00* (2006.01)
 *G08B 17/107* (2006.01)

(52) U.S. Cl.
 CPC ............. *G01N 21/53* (2013.01); *B08B 1/002* (2013.01); *B08B 1/04* (2013.01); *B08B 9/00* (2013.01); *B08B 13/00* (2013.01); *G08B 17/107* (2013.01)

(58) Field of Classification Search
 CPC .... G08B 17/113; G08B 17/107; G08B 17/10; G01N 21/53; G01N 2015/0046; B08B 13/00; B08B 9/00; B08B 1/04; B08B 1/002

USPC ......... 356/432–440, 338, 339; 250/574–575; 340/628, 693.6
See application file for complete search history.

(56) References Cited

U.S. PATENT DOCUMENTS

| 3,460,124 | A | | 8/1969 | Smith et al. | |
|---|---|---|---|---|---|
| 4,672,217 | A | * | 6/1987 | Dobrzanski | G08B 29/145 340/630 |
| 5,581,241 | A | * | 12/1996 | Kaufman | G08B 17/113 340/630 |
| 6,778,091 | B2 | * | 8/2004 | Qualey, III | G08B 17/107 340/630 |
| 2015/0302727 | A1 | | 10/2015 | Piccolo | |
| 2015/0310732 | A1 | | 10/2015 | Piccolo | |

FOREIGN PATENT DOCUMENTS

| CN | 104794311 A | 7/2015 |
|---|---|---|
| CN | 105448028 B | 12/2017 |
| CN | 209102569 U * | 7/2019 |

(Continued)

OTHER PUBLICATIONS

Preliminary Search Report for French Application No. 1910808 dated Jun. 19, 2020, 2 pages.

*Primary Examiner* — Hoa Q Pham
(74) *Attorney, Agent, or Firm* — Moreno IP Law LLC

(57) ABSTRACT

The present disclosure concerns a smoke detector (1) including: a detection chamber, a baffle system surrounding the chamber enabling to isolate the chamber from outer light and enabling air to flow from the outside to the inside of the chamber, and a mechanical actuator capable of cleaning, in case of an obstruction, intervals between the elements.

16 Claims, 6 Drawing Sheets

(56) References Cited

FOREIGN PATENT DOCUMENTS

DE     102016121369 A1      5/2018
GB          2327752 A   *   2/1999
JP          2008077473 A    4/2008

* cited by examiner (A)

(B)

SMOKE DETECTOR

FIELD

The present disclosure generally concerns smoke detection devices.

BACKGROUND

Many smoke detectors for preventing residential, company, or industrial fires are known.

SUMMARY

There is a need to improve current smoke detectors, particularly to improve the reliability of their operation and to lengthen their lifetime.

An embodiment provides a smoke detector comprising: a detection chamber; a baffle system surrounding the chamber enabling to isolate the chamber from outer light and enabling air to flow from the outside to the inside of the chamber; and a mechanical actuator capable of cleaning, in case of an obstruction, the baffles.

According to an embodiment, the detector comprises a device capable of notifying when the obstruction persists and cannot be cleaned by the mechanical actuator.

According to an embodiment, the baffles are created by a successive stacking of elements, each comprising a ring.

According to an embodiment, the cross-section of the rings has a general "U" or "V" shape.

According to an embodiment, the detector further comprises:
a package receiving said elements; and
a cover closing the stack opposite to the package, to close the chamber.

According to an embodiment, the detector further comprises an assembly of tabs interposed between two successive rings, each tab having a general shape corresponding to the general shape of the cross-section of the rings.

According to an embodiment, the assembly is supported by the package.

According to an embodiment, the assembly comprises one or a plurality of blades external to the rings.

According to an embodiment, the assembly rotates around the axial direction of the stack.

According to an embodiment, the assembly is driven by a motor.

According to an embodiment, the assembly is external to the chamber.

According to an embodiment, the assembly is fixed.

According to an embodiment, the rings are mobile and rotate around the axial direction of the stack.

According to an embodiment, the stack is driven by a motor.

According to an embodiment, the assembly is internal to the chamber.

According to an embodiment, the tabs are equipped with brushes and the stack is equipped with an external insect and dust screen, the screen being cleaned by the brushes during the rotation of the stack.

According to an embodiment, the detector further comprises an electronic control circuit.

According to an embodiment, the detector comprises, in the chamber, a light-emitting diode and a photodetector.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF THE PRESENT EMBODIMENTS

Figure 1:
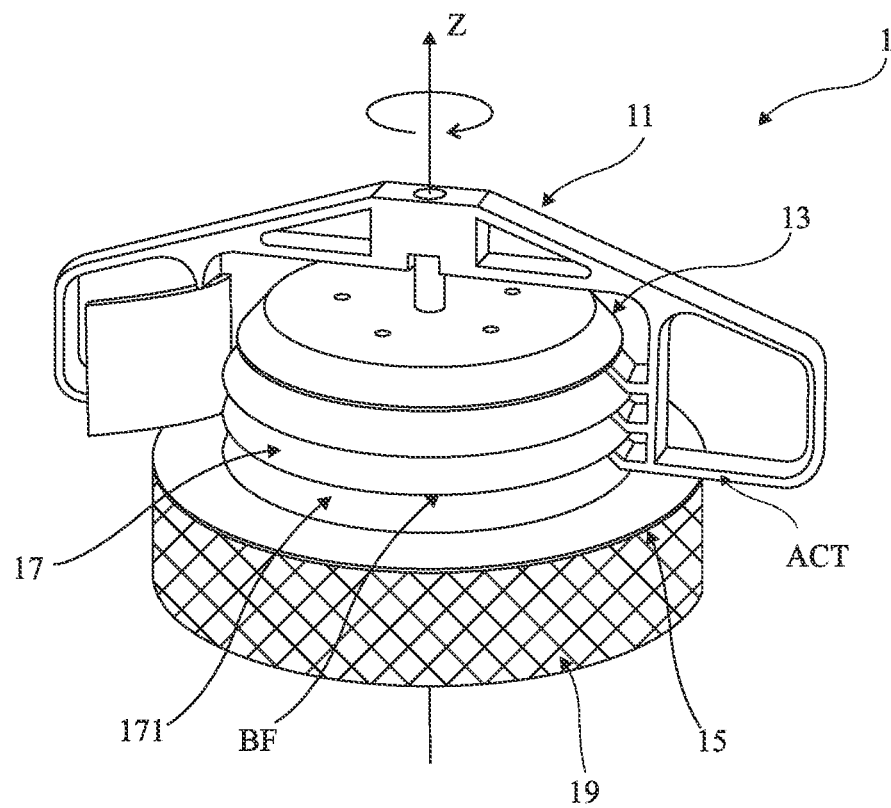
FIG. 1 is a partial simplified perspective representation of an embodiment of a smoke detector.

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the electronic control and measurement circuits as well as the light-emitting diodes and optical detectors, have not been detailed, the described embodiments being compatible with the structures and the operation of usual electronic circuits, diodes, and detectors.

Unless specified otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

The embodiments described hereafter apply to smoke detection, particularly to detect fires.

Certain smoke detectors also comprise heat or carbon monoxide detection functions.

The installation of smoke detectors is more and more often compulsory. Their operations, characteristics, and installation criteria and generally ruled by standards.

The installation and the operation of the detectors are, particularly in corporate and industrial environments, periodically checked. In particular, standard CE EN 14604 sets detection conditions.

Two categories of smoke detections are mainly known, ion detectors and optical detectors.

The embodiments described as an example concern optical detectors. These embodiments however more generally apply to any system of self-cleaning and detection of residual obstructions in a detector.

An optical smoke detector contains an optical chamber, a light-emitting diode (LED), and a receiver (photoelectric cell). The LED emits a light signal which, normally (in the absence of smoke), is absorbed by the walls of the chamber without reaching the detector. In the presence of smoke, the particles in suspension in the smoke reflect light. The light beam is thus dispersed in the chamber and enters into contact with the receiver or photodetector. If the light signal received by the receiver is greater than a determined threshold, an alarm is triggered.

The optical chamber is generally designed to:
be dark and opaque to outer light;
be capable of being crossed by the ambient air and thus have walls which let air flow; and
have walls which do not give way to insects or dust.

To meet all these criteria, certain current detectors comprise walls defining indirect passages from the outside to the inside of the chamber. The walls are positioned in a circle. The LED and the photodetector are placed in the chamber.

The sizing of the passages conditions the reliability of the detector and results from a tradeoff between the need to isolate the chamber from the outside and to let air flow therethrough.

Further, periodic operation tests are generally necessary.

The described embodiments originate from a novel analysis of the operation over time of a detector.

It could have been devised, to make the increase the reliability of detectors, to increase the dimension of the passages between the chamber and the outside. This would favor the passage of air but would also give way to certain insects and dust. It could conversely be devised to decrease the dimension of the passages to limit the passage of outer dust which would trigger untimely alarms. This would however favor the fouling of the passages, which would then either imply a frequent manual cleaning, or generate a lack of detection.

FIG. 1 is a partial simplified perspective representation of an embodiment of a smoke detector 1.

The detector 1 illustrated in FIG. 1 comprises a plurality of portions, including an optical chamber opaque to outer light, delimited at its periphery by a stack of elements 17, each comprising a ring 171.

Rings 171 are concentric. Each ring 171 has, in cross-section, a shape open in an axial direction of the stack. More particularly, the cross-section of rings 171 may have the general shape of a "V" or of a "U".

Rings 171 are stacked and embedded in one another, to delimit interstices or spaces between rings 171 where air may freely flow between the chamber and the outside. Due to their cross-section, rings 171 create air flow baffles. The assembly of baffles forms a baffle system.

As an alternative embodiment, rings 171 may be, during their manufacturing, molded at once to form one piece.

In the embodiment of FIG. 1, detector 1 comprises a vertical stack containing three elements 17 and thus three rings 171. The number of elements 17, and thus of rings 171, may be in the range from 1 to 20, preferably from 1 to 6, and is preferably equal to 3.

In the embodiment such as shown in FIG. 1, detector 1 further comprises:

a mobile assembly 11 capable of freely rotating around an axis Z, corresponding to the axis of the stack of elements 17;
a package 19 having an upper surface 15 supporting the stack of elements 17; and
a cover 13 which closes the chamber opposite to package 19.

Cover 13 and the upper surface 15 of package 19 close the chamber at its two axial ends. Electronic components of the optical chamber, such as for example a LED and a photodetector (not shown in FIG. 1), are fastened to surface 15 or to cover 13.

Mobile assembly 11 has a plurality of functions which will be described subsequently in further detail in relation with FIG. 3.

On the one hand, it may remove obstacles (dust, insects, etc.) to the flowing of air, or detect obstructions that it cannot clean.

On the other hand, it may ventilate the inside of the chamber.

Further, it may detect obstacles in the close environment of detector 1.

Package 19 further contains all the electronic circuits necessary to the operation of detector 1. The LED and the photodetector are particularly connected to these circuits.

Figure 2:
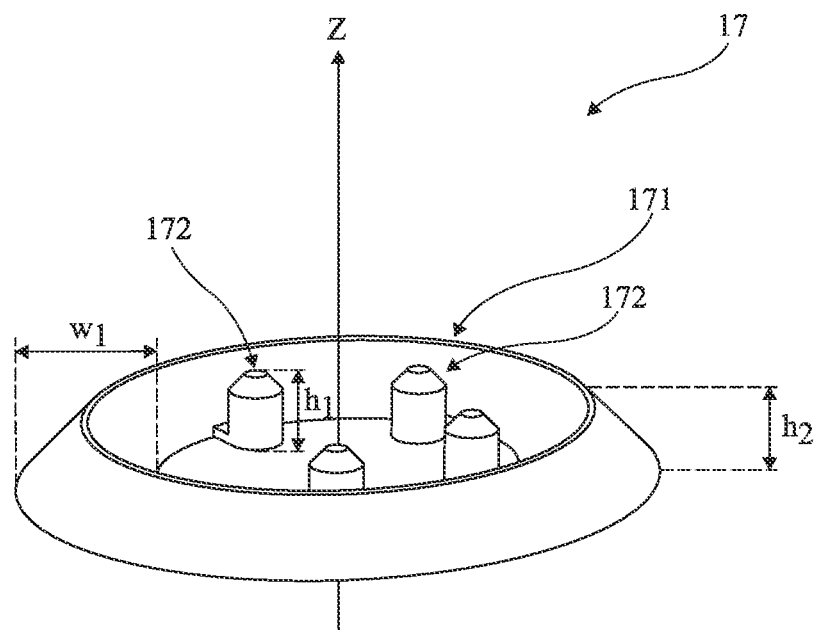
FIG. 2 is a perspective representation of an embodiment of an element of the detector of FIG. 1.

FIG. 2 is a perspective representation of an embodiment of an element 17 of the detector 1 of FIG. 1.

Each element 17 is formed of a ring 171 and of assembly pads 172. Assembly pads 172 are rigidly attached to ring 171. In the example of FIG. 2, pads 172 are inside of rings 171.

In the embodiment of FIG. 2, element 17 comprises four assembly pads 172. In practice and according to the embodiment, the number of assembly pads 172 per element 17 may be in the range from 1 to 10, preferably from 2 to 5, and is preferably equal to 4.

Assembly pads 172 enable to assemble elements 17, cover 13, and package 19 to one another. Assembly pads 172 reinforce detector 1 and impose, by their height, h1, a distance between rings 171. The pads 172 of an element 17 rest on the pads 172 of element 17 located just under or, for the first ring 171 of the stack, on surface 15 of package 19. The pads 172 of the last element 17 receive cover 13.

The larger (the higher) pads 172, the larger (the wider) the space between rings 171 in the stack. Conversely, the smaller pads 172, the smaller (the narrower) the space between rings 171.

In the embodiment of FIG. 2, the elements 17 of a stack all have identical assembly pads 172. Thus, all rings 171 are spaced apart from one another by the same distance, and this, in the entire stack.

It may be envisaged, in another embodiment, not shown, to impose different distances between the rings 171 of the stack. Thus, the size of the spaces between rings 171 may vary with the distance of ring 171 to package 19.

Rings 171 are not flat. Thus, the two branches (inner and outer) of ring 171 form an angle (not shown in FIG. 2). Call a the angle formed between the two branches of ring 171. Angle α corresponds either to the angle of the triangle for a "V"-shaped ring 171 (rectilinear branches), or to the angle of the triangle containing a "U"-shaped ring 171 (rounded branches).

Angle α is generally the same for all the rings 171 of a same stack. However, it may as a variant be different according to the embodiment.

Angle α is for example in the range from 10 to 170°, preferably from 45 to 120°, angle α being preferably equal to approximately 90°, for example, equal to 90°.

Each ring 171 has a height $h_2$. Height $h_2$ corresponds to the height between the lowest point of the cross-section of ring 171 and the highest point (the apex of the point or of the rounding).

The height $h_2$ of a ring 171 is for example in the range from 0.1 to 3 cm, preferably from 0.5 to 1.5 cm, height $h_2$ being preferably equal to approximately 0.7 cm, for example, equal to 0.7 cm.

The height $h_1$ of an assembly pad 172 is for example in the range from 0.1 to 3 cm, preferably from 0.5 to 1.5 cm, height $h_1$ being preferably equal to approximately 0.6 cm, for example, equal to 0.6 cm.

Height $h_1$ is preferably smaller than height $h_2$ so that the baffles form an obstacle to direct outer light.

Each ring 171 has a width $w_1$ for example in the range from 0.1 to 3 cm, preferably from 0.7 to 2 cm, width $w_1$ being preferably equal to approximately 1.5 cm, for example equal to 1.5 cm.

The number of elements 17 and the spacing of rings 171 are determined according to the environment where detector 1 is located (dust, insects, brightness, etc.). The two parameters are adjusted so that the ambient air can sufficiently ventilate the chamber, so that outer light cannot enter the chamber, and so that the dust and insects are blocked by the baffles.

Figure 3:
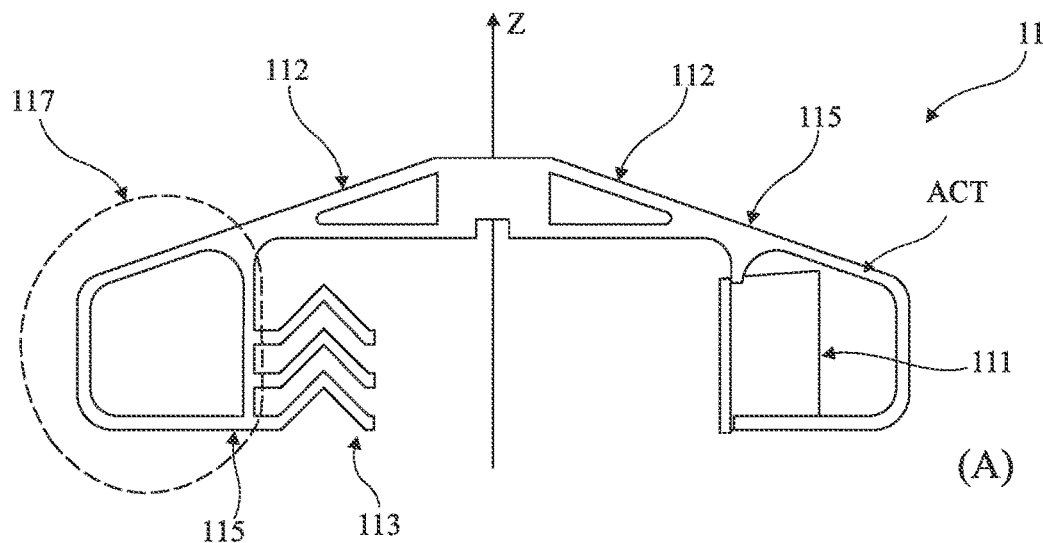
FIG. 3 is a representation in respective lateral, top, and perspective partial simplified views (A), (B), and (C), of an embodiment of a mobile assembly of the detector of FIG. 1.
Figure 3:
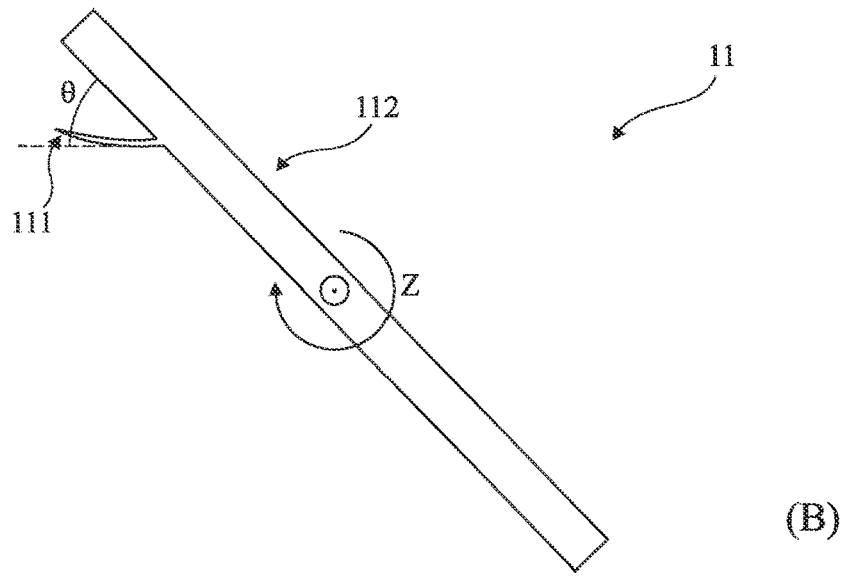
Figure 3:
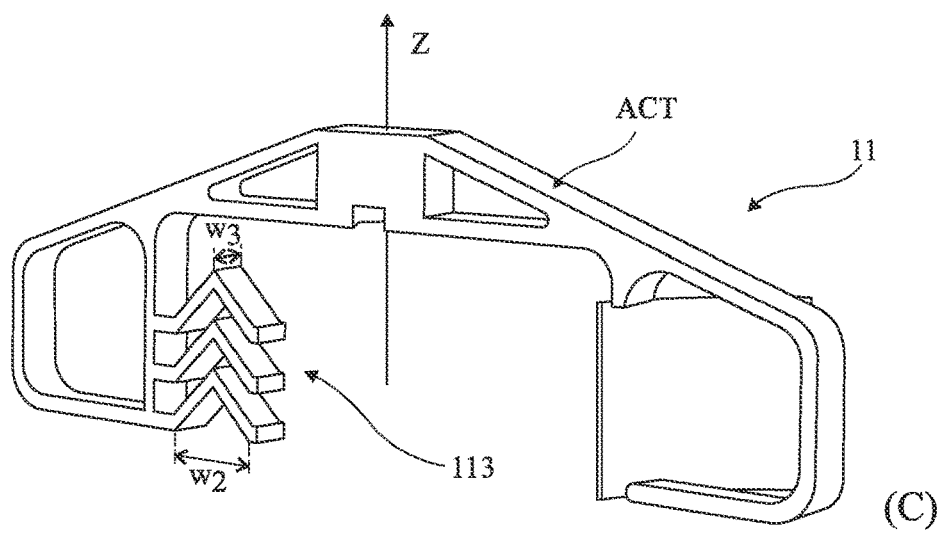

FIG. 3 is a representation in respective lateral, top, and perspective partial simplified views (A), (B), and (C), of an embodiment of a mobile assembly 11 of the detector 1 of FIG. 1.

Mobile assembly 11 is, in the embodiment of FIG. 3, external to the stack of elements 17. Thus, mobile assembly 11 rotates around the stack of elements 17 along axis Z.

Mobile assembly 11 is preferably motor-driven (placed in package 19), which enables to automatically generate its rotation. Mobile assembly 11 may as a variant be manually rotated.

In the embodiment of FIG. 3, mobile assembly 11 comprises two aligned arms 112, on either side of the rotation axis. Call "arm" 112, a portion of mobile assembly 11 which is coupled to rotation axis Z and which extends in a direction orthogonal to this same axis Z.

The number of arms 112 may be in the range from 1 to 20 preferably from 1 to 6, the number of arms being preferably equal to 2.

Preferably, each arm 112 supports a module comprising tabs 113, or a blade 111. Thus, a detector 1 comprising a plurality of arms 112 may receive one or a plurality of tab modules 113 and/or one or a plurality of blades 111.

In the embodiment of FIG. 3, a first arm 112 of mobile assembly 11 receives a module of three tabs 113. In practice, the number of tabs 113 is generally equal to the number of elements 17 of detector 1.

Tabs 113 are, in detector 1, interposed between two successive rings 171. Thus, tabs 113 rotate in the spaces between rings 171. Further, a tab 113 rotates in the space created between ring 171 closest to cover 13 and the latter. Preferably, the ring 171 closest to the upper surface 15 of package 19 is supported by this tab.

Tabs 113 preferably have, in cross-section, a shape corresponding to the shape of the cross-section of rings 171.

Tabs 113 are supported by a post 115 of the concerned arm 112. The rotation of mobile assembly 11 generates the rotation of tabs 113 between rings 171 as a fork or a comb which would have its teeth inserted between rings 171 from the outside.

In cross-section, the length $w_2$ (view (C)) of a tab 113 depends on the width $w_1$ of rings 171. It is generally equal to the width $w_1$ of rings 171. Length $w_2$ is, for example, in the range from 0.1 to 3 cm, preferably from 1 to 2.5 cm, length $w_2$ being preferably equal to approximately 1.5 cm, for example equal to 1.5 cm.

The width $w_3$ of a tab 113 is preferably constant. The width $w_3$ of a tab 113 is selected according to the dimensions of rings 171 and to the thickness of the interstices between rings 171 to be able to freely rotate (with a clearance) between two rings 171.

Width $w_3$ is for example in the range from 0.1 cm to 1.2 cm, preferably from 0.3 to 1 cm, width $w_3$ being preferably approximately equal to 0.8 cm, for example, equal to 0.8 cm.

As a variant, tabs 113 have shapes in an arc of a disk of same diameter as rings 171.

The passage of tabs 113 through the interstices of the baffles enables to remove therefrom obstacles to the flowing of air, for example, dust, insects, spider webs, etc.

For certain obstacles, the force of the motor is sufficient to clean the interstices.

For other obstacles, the force of the motor is not sufficient. However, it is possible to detect a resistance to the rotation and to emit an alarm notifying a potential malfunction of detector 1 due to obstructions. An operator may then manually drive mobile assembly 11, with a greater force than that of the motor, to remove, detach, or unblock the obstruction(s).

As a specific example of implementation, the motor is programmed to periodically rotate mobile assembly 11, for example, ten seconds every two hours.

The surfaces of tabs 113 may further be equipped with brushes to scrub, brush the surface of rings 171. This further enables to compensate for possible manufacturing tolerances of rings 171 and to favor the cleaning. The orientation of the brushes may further enable the discharge of the dust or dirt towards the outside of the baffles, opposite to the chamber.

The end of tabs 113 (inside of the chamber) may further be equipped with brushes to scrub and clean the surface of the LED and that of the photodetector. This further enables to favor the cleaning and thus decrease false detections.

In the embodiment of FIG. 3, a second arm 112 of mobile assembly 11 supports a blade 111.

Blade 111 is supported by a post 115 of arm 112. The rotation of mobile assembly 11 generates the rotation of blade 111 around rings 171. Blade 111 has the shape of a curved rectangle, or of sail.

Blade 111 is fastened to the post 115 of the arm 112 of mobile assembly 11 with an angle θ. Angle θ, which corresponds to the angle between the arm 112 of mobile assembly 11 having blade 111 attached thereto and the tangent to the base of blade 111, is for example in the range from 1 to 170°, preferably from 10 to 90°, angle θ being preferably equal to approximately 50°, for example, equal to 50°.

The curvature of blade 111, angle θ, and the rotation direction are provided to generate a suction at the level of the baffles. Thus, by rotating, blade 111 expels the air which is in front of it. The depression created behind blade 111 causes a suction of the air located inside of the chamber. The suction enables to renew the air in the chamber. The air which has been sucked in further enables to drive along, as it flows, the dust or deposits present on rings 171, and thus to clear the baffles.

The renewal of the air in the chamber by blades 111 also has the advantage of avoiding false detections. Indeed, in case of a suspicion of smoke, the renewal of the air in the chamber enables to confirm (or validate) or to disprove (or invalidate) the presence of smoke.

For example, when the photodetector detects scattered light, it may trigger a rotation of mobile assembly 11. The renewal of the air in the chamber then enables to remove the doubt. If the photodetector no longer detects scattered light, this means that it was a false alert. Conversely, if the photodetector still receives a scattered light beam, there effectively is smoke in the environment of detector 1.

An advantage is that the cleaning of the baffles, but also the renewal of the air in the chamber, enables to increase the reliability of detector 1 by decreasing false alerts.

In the embodiment of FIG. 3, the two arms 112 support hoops 117 at their free ends. Hoops 117 stiffen the structure without excessively increasing its weight. Hoops 117 are supported by posts 115. Hoops 117 enable to detect obstacles close (a few centimeters) to detector 1. The detection distance depends on the dimension of hoops 117 and more particularly on the length (orthogonal to axis Z) added to arm 112.

A removable and extensible stem (not shown) may further be fastened to the top of mobile assembly 11. The stem enables to detect (by rotating) whether objects are present in the environment close to detector 1 (a few tens of centimeters) to verify whether security distances set by standards are respected. For example, an alarm is emitted in case of a resistance to the rotation to indicate that detector 1 is mispositioned or that objects have been stored too close thereto.

Figure 4:
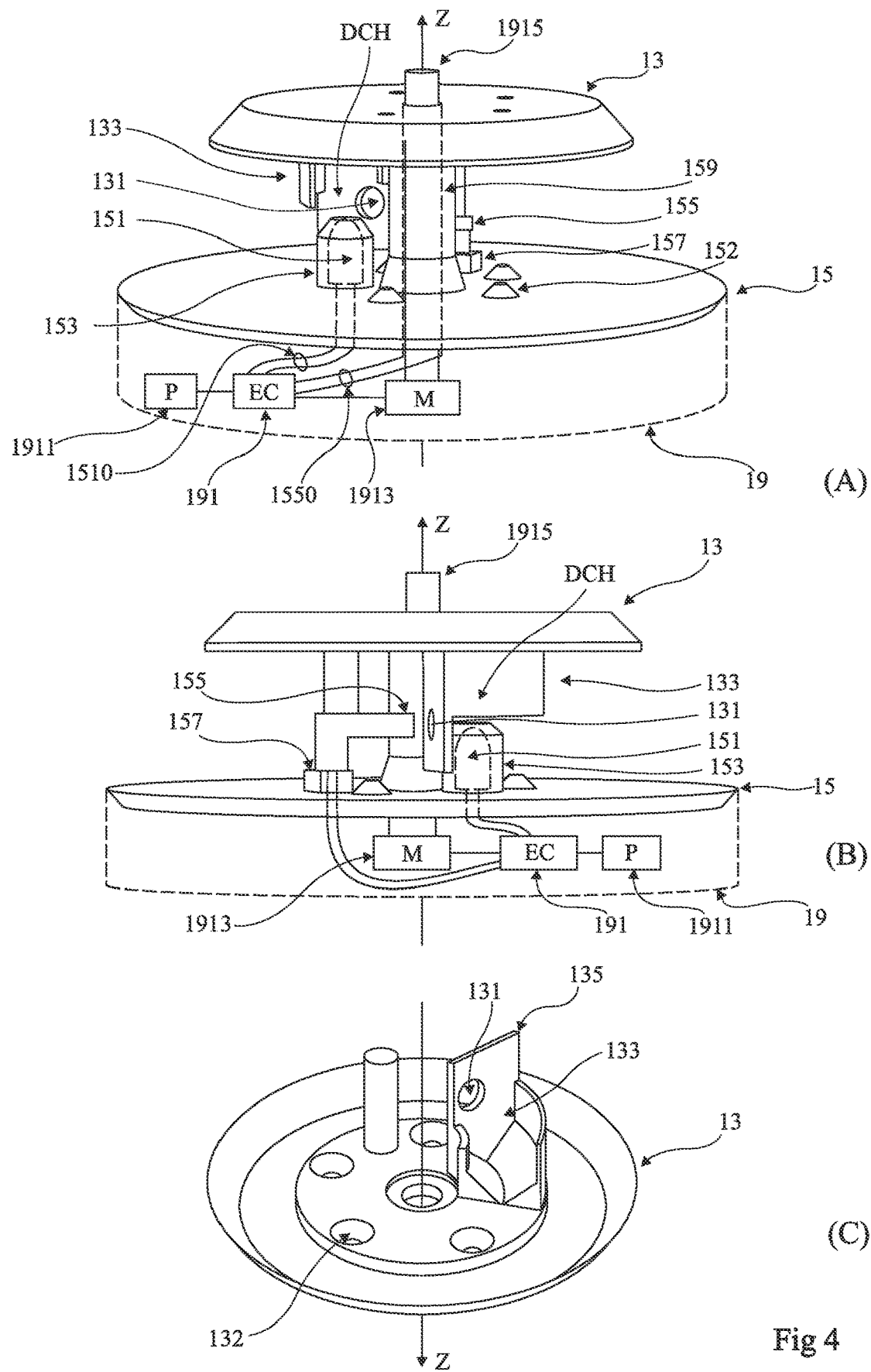
FIG. 4 is a perspective representation in partial simplified views (A), (B), and (C), of an embodiment of portions of the detector of FIG. 1.

FIG. 4 is a perspective representation in partial simplified views (A), (B), and (C) of an embodiment of portions 13 and 15 of the detector 1 of FIG. 1.

Views (A) and (B) show cover 13 and the upper surface 15 of package 19. View (C) shows the inside of cover 13.

The upper surface 15 of package 19 comprises, among others, a hollow cylinder 159 having a drive shaft 1915 running therethrough. Drive shaft 1915 causes by its rotation the rotation of mobile assembly 11 around axis Z. Mobile assembly 11 is attached to drive shaft 1915 at the exit of cylinder 159 (above cover 13). Drive shaft 1915 is coupled, in package 19, to a motor 1913 (M). The motor is coupled to an electronic control circuit 191 (EC). Circuit 191 and/or the motor are powered by a power source 1911 (P). Power source 1911 is for example a cell or a battery.

Upper surface 15 further comprises conical bases 152 (four in FIG. 4). The assembly pads 172 of elements 17 are placed on bases 152 and aligned therewith. Bases 152 thus enable to attach elements 17 to package 19, by upper surface 15 thereof. The number of bases 152 is equal to the number of assembly pads 172 present on each of the elements 17 of detector 1.

Upper surface 15 further comprises a first location 153 for receiving LED 151 and a second location 157 for receiving photodetector 155.

First location 153 has the shape of a hollow cylinder having its end located in the tapered chamber. The inside of the cylinder is intended to receive LED 151, which is vertically engaged from the inside of package 19.

Second location 157 has the shape of a pad protruding from upper surface 15 and receives photodetector 155. Photodetector 155 is horizontally positioned (in a plane orthogonal to axis Z).

LED 151 and photodetector 155 are electrically coupled (links 1510 and 1550) to electronic control circuit 191 located in package 19, and are preferably supported by an electronic board supporting circuit 191.

Cover 13 comprises, among others, holes 132 (four in FIG. 4) which are placed on assembly pads 172 and aligned therewith. Holes 132 thus enable to fasten (for example, by means of screws) cover 13 to elements 17 and to package 19, by upper surface 15. The number of holes 132 is equal to the number of bases 152, and thus to the number of assembly pads 172 present on each of the elements 17 of detector 1.

Cover 13 further comprises an optical sub-chamber 133. Sub-chamber 133 is, like the optical chamber, dark and opaque. Sub-chamber 133 is optically isolated from the chamber by screens to decrease the risk of contamination of sub-chamber 133 by the outer light. One 135 of the screens of sub-chamber 133 is vertical and comprises a hole 131 placed in front of photodetector 155. Hole 131 is arranged so that the photodetector observes, through hole 131, sub-chamber 133 at the level of the top of location 153, and thus of LED 151.

Bases 152 and the inner surfaces of holes 132 are preferably conical and adapted to the respective ends of pads 172 to ease the assembly and guarantee the alignment of the stack of rings 171. Further, this enables to set the position of sub-chamber 133 relative to LED 151.

When smoke detector 1 is in operation, LED 151 emits a light beam. The light beam is focused due to the conical shape of cylinder 153. In the absence of smoke, the beam is absorbed by the screens of dark sub-chamber 133 and photodetector 155 detects no light. In the presence of smoke, particles are in suspension in the air of the chamber and the beam emitted by LED 151 is scattered by the smoke particles. Photodetector 155 then detects, through hole 131, scattered (indirect) light. Photodetector 155 electrically transmits to electronic circuit 191 information representation of the intensity of the received light signal.

Figure 5:
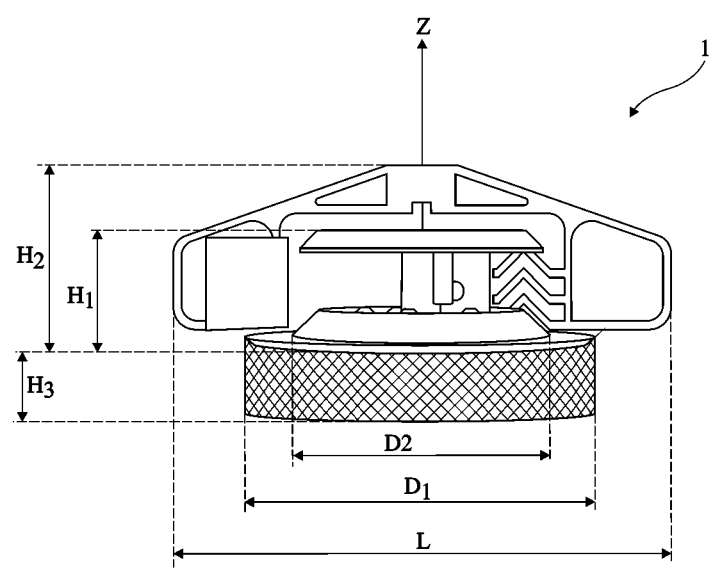
FIG. 5 is a partial simplifier lateral representation of an embodiment of the smoke detector of FIG. 1.

FIG. 5 is a partial simplified lateral representation of an embodiment of the detector of FIG. 1. More particularly, FIG. 5 shows the portions 11, 13, 15, 17 of the smoke detector 1 of FIG. 1.

This drawing highlights respective dimensions between the different elements.

As an example of embodiment, a detector 1 may have the following dimensions:

the diameter $D_1$ of package 19 is in the range from 3 to 20 cm, preferably from 5 to 15 cm, diameter $D_1$ being preferably equal to approximately 9 cm, for example, equal to 9 cm;

the external diameter $D_2$ of the stack of elements 17, or external diameter of rings 171, is in the range from 3 to 20 cm, preferably from 5 to 15 cm, diameter $D_2$ being preferably equal to approximately 7 cm, for example, equal to 7 cm;

the length L of mobile assembly 11 is greater than diameter $D_2$—length L is in the range from 3 to 30 cm, preferably from 5 to 15 cm, length L being preferably equal to approximately 13 cm, for example, equal to 13 cm;

the height $H_1$ of the stack of elements 17 depends on the number of rings 171 of the stack, on the height of a ring 171, and on the interval between two rings 171—height $H_1$ is in the range from 0.5 to 15 cm, preferably from 1 to 5 cm, height $H_1$ being preferably equal to approximately 3 cm, for example, equal to 3 cm;

the height $H_2$ of detector 1, without package 19, is in the range from 1 to 20 cm, preferably from 2 to 10 cm, height $H_2$ being preferably equal to approximately 5 cm, for example, equal to 5 cm; and the height $H_3$ of package 19 is in the range from 1 to 10 cm, preferably from 1 to 8 cm, height $H_3$ being preferably equal to approximately 3 cm, for example, equal to 3 cm.

Figure 6:
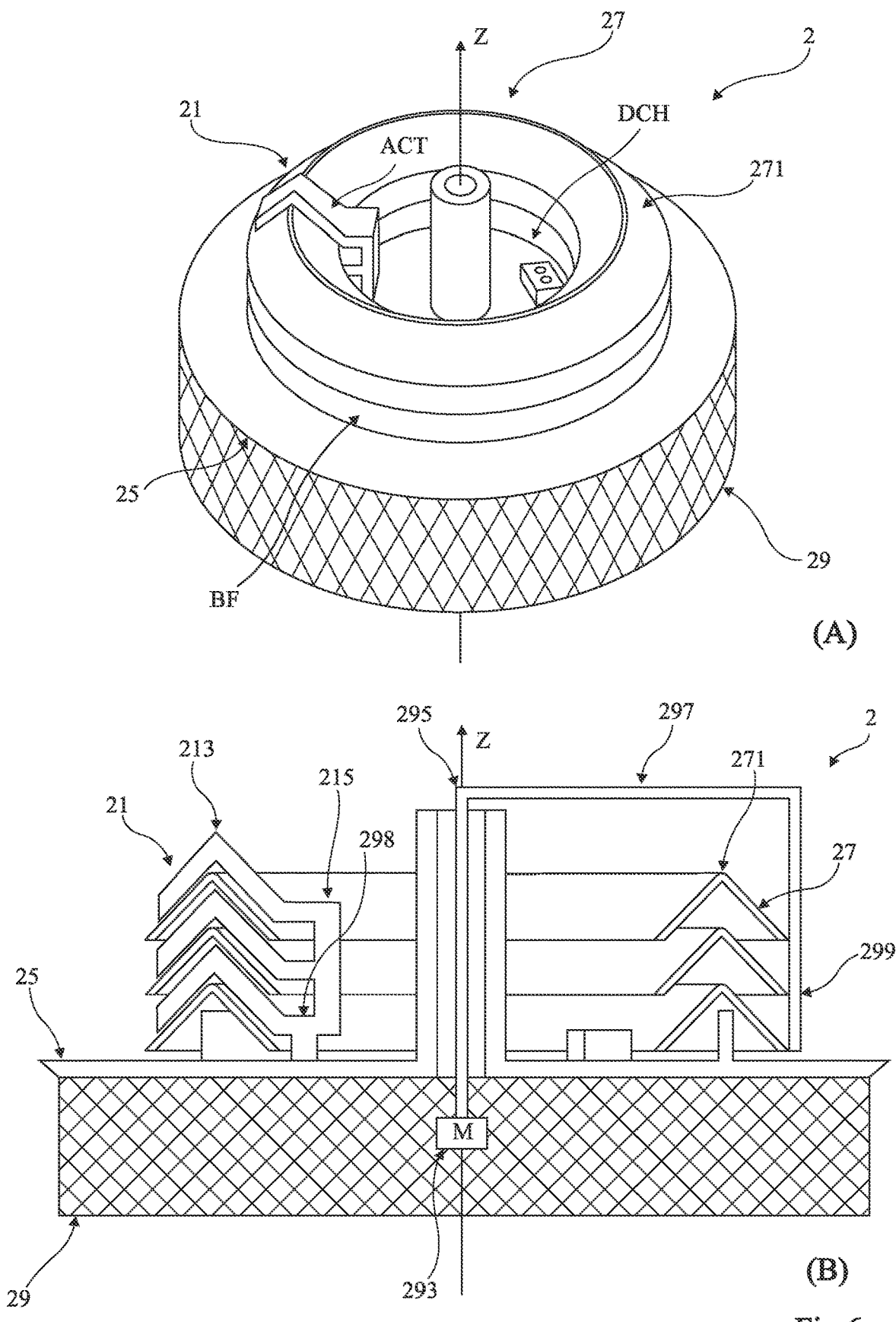
FIG. 6 is a representation, in partial simplified respectively perspective and cross-section views (A) and (B), of another embodiment of a smoke detector.

FIG. 6 is a representation, in respective perspective and cross-section partial simplified views (A) and (B), of another embodiment of a smoke detector.

Detector 2 comprises among others a package 29, having an upper surface 25 supporting a stack of elements 27.

The embodiment shown in FIG. 6 differs from the embodiment described in relation with FIG. 1 by the fact that the cleaning of the baffles is performed by an assembly 21 internal to the chamber. Assembly 21 is equipped with a module of tabs 213 similar to the tabs 113 of the mobile assembly 11 of the detector 1 of FIG. 1. Tabs 213 are attached to the upper surface 25 of the package by a bracket 215 resting (foot 298) on package 29. The tabs 213 of assembly 21 move in the spaces formed between rings 271 of elements 27. Assembly 21, in the embodiment of FIG. 6, is fixed and the stack of elements 27 is mobile. The stack of elements 27 is for example fastened to one or a plurality of structures 297.

Each structure 297 for example has the shape of an upside down "U". The number of structures is selected to leave the largest possible number of air passages while ensuring the mechanical hold of rings 271. The structures are coupled, by a drive shaft 295, to a motor 293 (placed in package 29). Motor 293 generates the rotation of stack 27, by drive shaft 295 and structure(s) 297.

Each structure 297 is fastened, for example, to all the rings 271 of the stack, by attachment points 299 located outside of the base of rings 271.

In this assembly, elements 27 comprise no assembly pads. The spacing between rings 271 is for example determined by the spacing between attachment points 299. The space between the attachment points is for example in the range from 0.1 to 3 cm, preferably from 0.5 to 1.5 cm and is preferably equal to approximately 0.7 cm, for example, equal to 0.7 cm.

It can be envisaged, in another embodiment, not shown, to impose different distances between rings 271. The spacing between the attachment points is then variable.

As a variant, rings 271 are fastened to one another by pads (not shown in FIG. 6) coupling then together in their cross-section.

As an example, brushes (not shown in FIG. 6) may be fastened to the outer ends of tabs 213 and an insect and dust screen may be fastened to the stack of elements 27. The rotation of the grating, driven by the rotation of the stack, generates a friction of the brushes on the grating and thus a cleaning thereof.

All or part of the variants of the embodiment of FIG. 1 apply to the embodiment of FIG. 6. In particular, it may be envisaged to fasten, at the end of a tab 213 of assembly 21, a fan blade similar to the blade 111 of detector 1 shown in FIG. 3.

Figure 7:
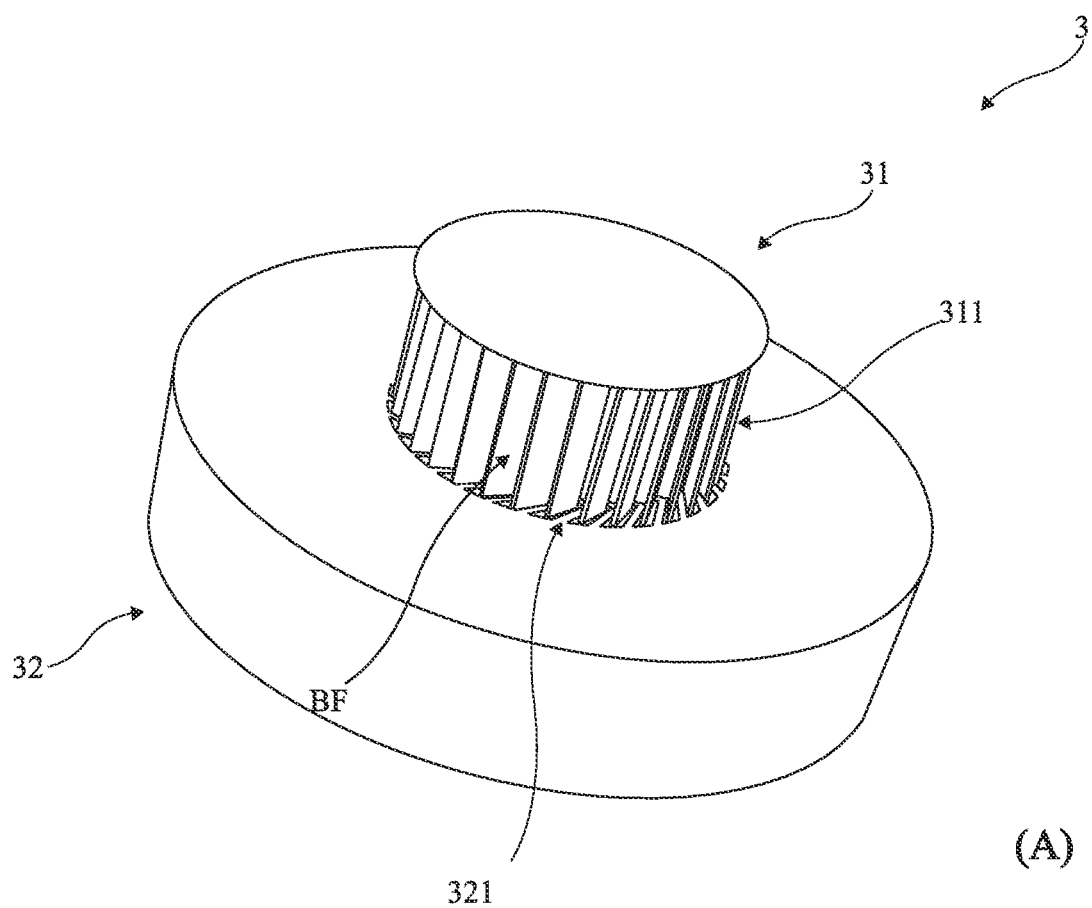
FIG. 7 is a representation, in partial simplified perspective views (A) and (B), of another embodiment of a smoke detector.
Figure 7:
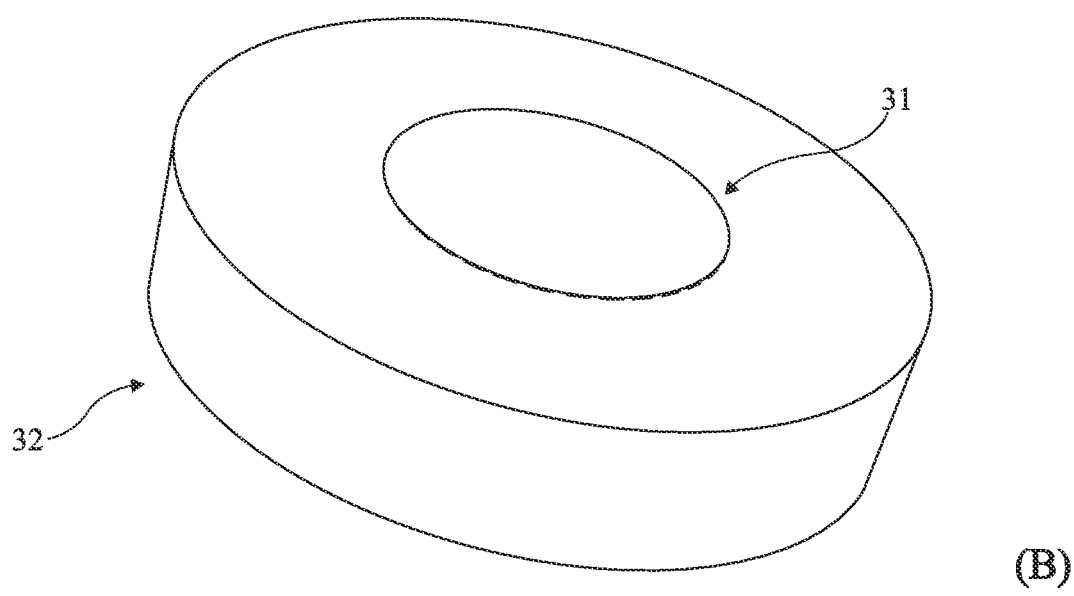

FIG. 7 is a representation, in partial simplified perspective views (A) and (B), of another embodiment of a smoke detector 3.

Detector 3 comprises among others a package formed of a mobile part 31 and of a fixed part 32.

Mobile part 31 corresponds to a cylinder having its lateral surface comprising a succession of vertical angulous walls 311 defining indirect passages or baffles from the outside to an optical chamber present inside of said cylinder. The assembly of these baffles forms a baffle system.

Fixed part 32 corresponds to another cylinder. Fixed part 32 forms a ring for receiving mobile part 31. The inner lateral surface of fixed part 32 is provide with walls 321 having substantially the same shape as the baffles so that mobile part 31 can vertically slide in fixed part 32.

In the embodiment illustrated in FIG. 7, the sliding motion of the mobile part in the fixed part enables to clean the baffles. More particularly, the sliding of the walls 321 of fixed part 32 in the baffles of mobile part 31 enables to clear the baffles from possible obstructions.

The cleaning is for example performed by manual action on part 31 to sink it into part 32, against an elastic recoil force caused by a spring.

An advantage of the described embodiments and implementation modes is the increase in the reliability of the detector by the possibility of integrally testing its detection system and its environment.

Another advantage of the described embodiments and implementation modes is the ability of the detector to self-clean.

Various embodiments and variants have been described. Those skilled in the art will understand that certain features of these embodiments can be combined and other variants will readily occur to those skilled in the art.

Finally, the practical implementation of the described embodiments and variations is within the abilities of those skilled in the art based on the functional indications given hereabove.

What is claimed is:

1. A smoke detector comprising:
   a detection chamber;
   a baffle system surrounding the chamber, enabling to isolate the chamber from outer light and enabling air to flow from the outside to the inside of the chamber, and wherein baffles of the baffle system are created by a successive stacking of elements, each comprising a ring; and
   a mechanical actuator configured to clean, in case of an obstruction, the baffles, wherein the mechanical actuator comprises an assembly of tabs interposed between two successive rings.

2. The detector according to claim 1, wherein the cross-section of the rings has a general "U" or "V" shape.

3. The detector according to claim 1, further comprising:
   a package receiving said elements; and
   a cover closing the stack opposite to the package, to close the chamber.

4. The detector according to claim 3, wherein each tab has a general shape corresponding to a general shape of a cross-section of the rings.

5. The detector according to claim 4, wherein the assembly is supported by the package.

6. The detector according to claim 4, wherein the assembly comprises one or a plurality of blades external to the rings.

7. The detector according to claim 4, wherein the assembly rotates around the axial direction of the stack.

8. The detector according to claim 7, wherein the assembly is driven by a motor.

9. The detector according to claim 4, wherein the assembly is external to the chamber.

10. The detector according to claim 4, wherein the assembly is fixed.

11. The detector according to claim 4, wherein the rings are mobile and rotate around the axial direction of the stack.

12. The detector according to claim 11, wherein the stack is driven by a motor.

13. The detector according to claim 4, wherein the assembly is internal to the chamber.

14. The device according to claim 4, wherein the tabs are equipped with brushes and the stack is equipped with an external insect and dust screen, the screen being cleaned by the brushes during the rotation of the stack.

15. The detector according to claim 1, further comprising an electronic control circuit.

16. The detector according to claim 1, comprising, in the chamber, a light-emitting diode and a photodetector.

* * * * *